United States Patent

[11] 3,588,508

[72] Inventor Harold Wieder
     Cupertino, Calif.
[21] Appl. No. 763,890
[22] Filed Sept. 30, 1968
[45] Patented June 28, 1971
[73] Assignee International Business Machines Corporation
     Armonk, N.Y.

[54] LASER INFRARED IMAGE CONVERTER
     14 Claims, 1 Drawing Fig.
[52] U.S. Cl. ................................................. 250/83.3,
                                               250/213, 331/94.5
[51] Int. Cl. .................................................. H01s 3/00
[50] Field of Search ...................................... 250/83.3
                                        (IR), 83.3 (IRF), 213; 331/94.5

[56] References Cited
     UNITED STATES PATENTS
3,454,768  7/1969  Kompfner .................. 250/83.3IRI
3,470,374  9/1969  Jones ......................... 250/83.3IR Primary Examiner—Archie R. Borchelt
Attorney—Hanifin and Jancin ABSTRACT: A device for converting infrared images into visible images is described which employs laser technology. The infrared image, if necessary, is first amplified by passing it through an active laser medium with inverted population. Image forming lenses and field lenses may be provided in the amplification stage to preserve the image. If the infrared image has sufficient power, amplification may not be required. The image is then transmitted into a multimode degenerate laser cavity. The laser cavity consists of an active medium disposed between two end mirrors. The laser cavity is of the type having an upper level which is a common level for laser transitions to two lower levels, one transition occurring in the infrared range and one in the visible range. The two end mirrors of the cavity are highly reflective for the visible mode and highly transmissive for the infrared mode so that the laser operates in the visible mode. The active medium in the laser cavity is thresholded such that when the infrared image is transmitted into the cavity, the light path modes carrying the infrared light will be depopulated and will "turn off" where the infrared image is most intense. Those light modes where the infrared image is not present will continue to lase most intensely in the visible and a complement or negative of the infrared image will be produced, with the result that a visible image can be coupled out of the cavity which has visible light in those regions where the infrared of the image was not present.

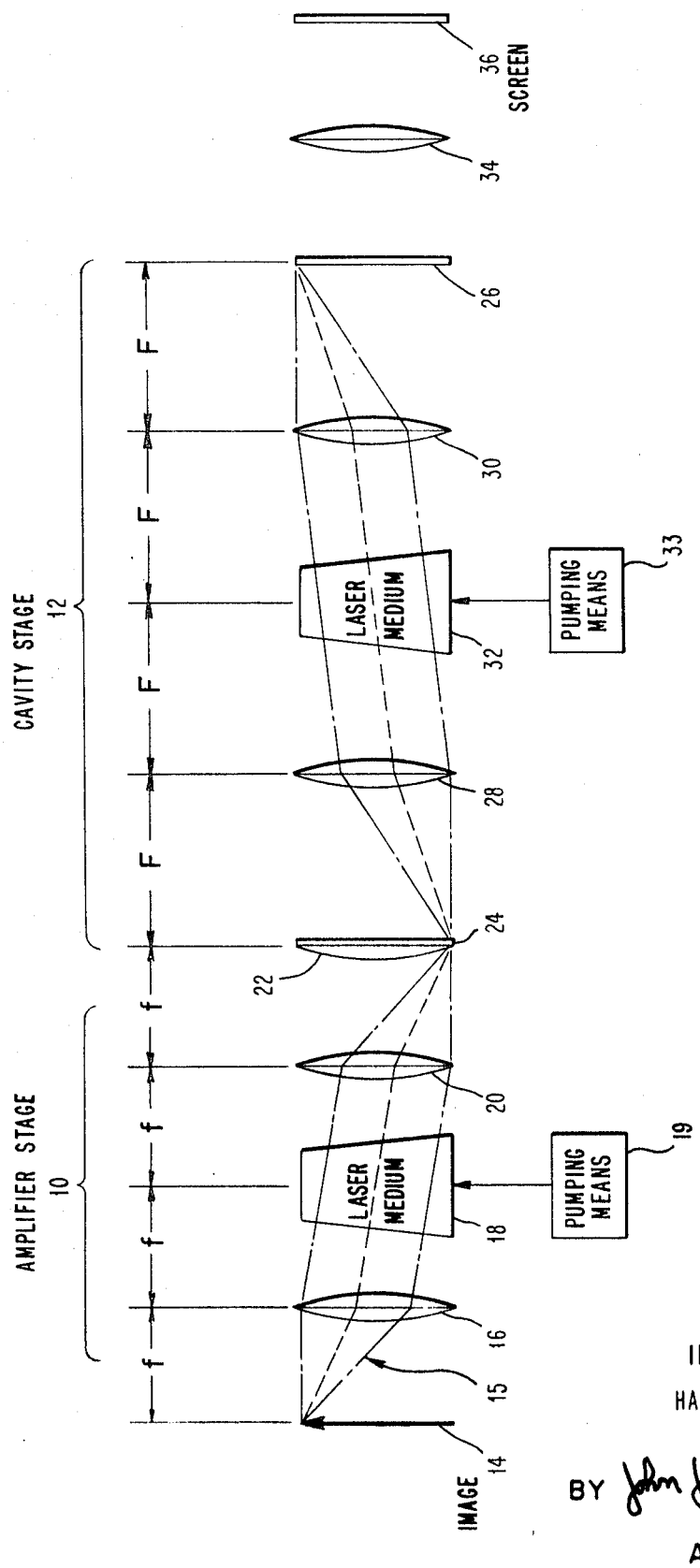

LASER INFRARED IMAGE CONVERTER

BACKGROUND OF THE INVENTION

1. Field of the Invention

The present invention relates to the radiant energy detection device art and, more particularly, to the art of converting infrared images into visible images.

2. Description of the Prior Art

A prior art device for converting infrared images into visible images is known as an image converter. The image converter involves two conversion steps. The infrared image is focused onto a photoemissive cathode and the incident photons cause an electron image of the scene to be formed. The photoemissive current density at each small element of the image corresponds to the radiance of the infrared image in that portion of the scene. The electrons produced are accelerated down the converter tube by an applied electron field and impinge upon a phosphor causing the scene to appear on the phosphor as a visible image. The device of the present invention does not require a photoemissive cathode or a phosphor.

SUMMARY OF THE INVENTION

The present invention is an infrared to visible image converter employing laser technology. The laser is a multimode degenerate cavity laser having a plurality of light beam modes. The active medium in the cavity is thresholded such that the multimode paths lase in the visible. By impinging the infrared light on the active medium, the active medium is depopulated along those modes containing the infrared light. The light paths where the infrared image is not present will continue to lase in the visible, producing a negative of the infrared image on the end mirror of the cavity.

The present invention thus provides a device capable of converting the infrared image directly into a visible image without the significant loss in resolution which usually occurs in the prior art devices due to the intermediate step of producing electrons from the image photons.

Thus, it is an object of the present invention to provide a device for converting infrared images to visible images employing a laser cavity.

The foregoing and other objects, features and advantages of the invention will be apparent from the following more particular description of a preferred embodiment of the invention, as illustrated in the accompanying drawing.

BRIEF DESCRIPTION OF THE DRAWING

The single FIGURE is a schematic illustration of a laser infrared image converter following the principles of the present invention.

DESCRIPTION OF THE PREFERRED EMBODIMENT

Referring to the FIGURE, an image converter for infrared images is shown including a laser amplifier stage 10 (which may not be necessary under given conditions) and a laser cavity 12. The infrared image, which is represented by arrow 14, is directed through lens 16, inverted population laser medium 18 and lens 20 of the laser amplifier 10. The lenses 16 and 20 preserve the image at unit magnification, while allowing the image to pass through the laser medium 18. The active medium 18 is employed to raise the power level of the infrared image. The active medium 18 and its associated pumping means 19 is the same as the active medium employed in laser cavity 12 and will be more fully described in a discussion of the cavity.

An amplified infrared image is therefore provided at the output of laser amplifier stage 10. If further amplification is desired, a plurality of amplifier stages identical to stage 10 may be employed. The amplified infrared image is impinged on laser cavity 12 via a field lens 22 which serves to redirect the spreading light into the laser cavity without performing any imaging function, i.e., it preserves the efficiency of the system. Laser cavity 12 may be similar to a flat-field conjugate laser as described by R. A. Myers and R. V. Pole in "Flat-Field Conjugate Laser, " Journal of the Optical Society of America, Volume 55, page 1574 (1965). The cavity is structurally similar to amplifier stage 10 except that reflective surfaces are included to effect resonating. The laser cavity 12 includes two flat reflective surfaces, such as mirrors 24 and 26, and two focusing elements, such as lenses 28 and 30. Mirrors 24 and 26 are located in the focal plane of lenses 28 and 30 respectively and lenses 28 and 30 are separated by twice their focal length. Each point on the surface of mirror 24 has a corresponding conjugate point on the surface of mirror 26. Ray bundle 15 illustrates the effect of lenses 16, 20, 22, 28 and 30.

An inverted population laser medium 32 (the active medium) is located between the lenses 28 and 30 such that light reflected back and forth between the mirrors 24 and 26 passes through it. A suitable pumping source 33 is associated with the active medium 32. The laser cavity 12 is a multimode device, that is, the cavity supports a large number of separate oscillations in degenerate transverse modes. The active medium 32 is any medium which has an upper level which is a common level for laser transitions to two lower levels, one transition occurring in the infrared range and the other transition occurring in the infrared range and the other transition occurring in the visible range. The medium may also be one in which the lower level is common for transition to two upper levels and the same effect would be obtained. In many mediums, the infrared line has considerably higher gain than the visible line. Examples of mediums and lines of this type are the helium-neon type wherein both the $3.39\mu$ line and the $0.63\mu$ line of neon originate from the same upper level $3s_2$, the infrared wavelength corresponding to transitions to the $3\ p_4$ state and the visible wavelength corresponding to transitions to the $2p_4$ state. The infrared wavelength has at least three orders of magnitude more gain in helium-neon than the visible wavelength. Also, the $1.55\mu$ and the $0.61\mu$ lines of ionized mercury are lines wherein the infrared line has higher gain than the visible line.

Mirrors 24 and 26 are selected to be highly reflective for the visible line and highly transmissive for the infrared line. The laser therefore operates in the visible mode. Thus, in the order of $10^6$ transverse modes lase at the visible level. The active medium is set at a threshold such that when the infrared image from the amplifier stage is transmitted into the cavity 12 via mirror 24, the light paths or modes which occupy the same spatial position as the infrared image will be depopulated or Q spoiled. To phrase the operation in another way, the infrared image focused on mirror 24 is transmitted into the cavity and will be carried through the active medium by the resonator modes. Infrared images normally contain a wide spectrum of infrared frequencies among which will be included the infrared laser frequency. The active medium is depopulated by the impinging infrared light and, due to the higher gain of the infrared line, the paths or modes which carry the most intense portion of the infrared image will lase in the infrared and not in the visible. Along other paths or modes the laser will lase in the visible to an extent determined by the impinging infrared light, the most intense visible light occurring along those modes for which there is no infrared light.

Thus, while the infrared image is further amplified through the laser cavity and is reimaged on mirror 26, the modes which oscillate in the visible will present a complementary or "negative" image of the same information in the plane of mirror 26. The visible light can be coupled out of the cavity through mirror 26 and through a conventional projection system, such as lens 34 and screen 36. The visible image is of opposite sign of the original infrared image and is obtained without significant loss in resolution (since the resolution of the system is diffraction limited only) and without requiring intermediate processing.

In the previous discussion, the laser cavity 12 was shown in combination with a laser amplifier stage 10 and it was stated that, if necessary, additional stages could be employed. Conversely, if the infrared image has sufficient energy, it could be directly entered into the cavity 12 without amplification. It is known that the infrared wavelength has at least three orders of magnitude more gain in helium-neon than the visible wavelength and it may even be several orders greater than this. By providing a 30 microwatt visible helium-neon laser and operating close to threshold, a 1 percent Q spoiling effect (0.3 microwatt) is needed to turn off the visible laser. Thus, if 0.3 microwatts of power at the infrared wavelength is incident at the incoming end of laser cavity 12, it will certainly Q-spoil the laser since the infrared power will be further amplified through the active medium, thus providing an even larger average power within the laser cavity. Also, the mirror 26 could be made highly reflective to both the visible and the infrared wavelengths. The infrared light would then make two passes through the active medium instead of one, thereby doubling the sensitivity.

If prior to entering the laser cavity 12, the infrared light is amplified in stage 10 over a 10 meter path length, then assuming the poorest gain of the infrared line, 1,000 times less power is needed at the input end of amplifier stage 10, which means the original image need have only 300 micromicrowatts of light at the infrared wavelength.

While the invention has been particularly shown and described with reference to a preferred embodiment thereof, it will be understood by those skilled in the art that the foregoing and other changes in form and details may be made therein without departing from the spirit and scope of the invention.

I claim:

1. An apparatus for converting an infrared image to a visible image comprising:
   an optical resonant cavity including a first reflective means and a second reflective means;
   an inverted population laser medium located in said cavity between said first and second reflective means for producing a plurality of resonant modes in said cavity;
   said laser medium having a common energy level for transitions to two other energy levels, producing a visible and an infrared laser frequency;
   pumping means coupled to said laser medium for thresholding said laser medium to produce a plurality of oscillating laser modes in said cavity at said visible frequency; and
   means for introducing an infrared image into said cavity for depopulating selected ones of said visible modes in the path of said infrared image to produce at said second reflective means a visible image which is the complement of said infrared image.

2. An apparatus according to claim 1 wherein said common energy level is an upper level and said two other energy levels are lower levels.

3. An apparatus according to claim 2 further including a laser amplifier located proximate to said first reflective means of said cavity for amplifying the radiation of said infrared image prior to introducing said infrared image into said cavity.

4. An apparatus according to claim 2 wherein said optical resonant cavity includes first and second lenses having the same value focal length, said first lens being located one focal length distance from said first reflective means, said second lens being located one focal length from said second reflective means, said first and second lenses being separated from each other by a distance of two focal lengths, said first and second lenses providing an optical relationship between said reflective surfaces such that there is a corresponding conjugate point on said second reflective surface for each point on said first reflective surface.

5. An apparatus according to claim 2 wherein said first and second reflective means are first and second mirrors which are highly reflective for said visible frequency modes and highly transmissive for said infrared frequency modes.

6. An apparatus according to claim 2 wherein said first and second reflective means are first and second mirrors, said first mirror being highly reflective for said visible frequency modes and highly transmissive for said infrared frequency modes, and said second mirror being highly reflective for said infrared and visible frequency modes.

7. An apparatus according to claim 2 wherein said laser medium is a mixture of helium and neon gas.

8. An apparatus for converting an infrared image to a visible image comprising:
   an optical resonant laser cavity including first and second mirrors located opposite each other at each end of said cavity, an inverted population laser medium located in said cavity between said first and second reflective means for producing a plurality of resonant modes in said cavity, said laser medium having a common energy level for transitions to two other energy levels, producing a visible and an infrared laser frequency, first and second lenses having the same value focal length, said first lens being located one focal length distance from said first mirror, said second lens being located one focal length distance from said second mirror, and said first and second lenses being separated from each other by a distance of two focal lengths, said first and second lenses providing an optical relationship between said first and second mirrors such that there is a corresponding conjugate point on the surface of said second mirror for each point on said first mirror;
   pumping means coupled to said laser medium to produce a plurality of oscillating laser modes in said cavity at said visible frequency; and
   means for introducing an infrared image into said cavity for depopulating selected ones of said visible modes in the path of said infrared image to produce at said second mirror a visible image which is the complement of said infrared image.

9. An apparatus according to claim 8 wherein said common energy level is an upper level and said two other energy levels are lower levels.

10. An apparatus according to claim 9 further including a laser amplifier located proximate to said first mirror for amplifying the radiation of said infrared image prior to introducing said infrared image into said cavity.

11. An apparatus according to claim 9 wherein said first and second mirrors are highly reflective for said visible frequency modes and highly transmissive for said infrared frequency modes.

12. An apparatus according to claim 9 wherein said first mirror is highly reflective for said visible frequency modes and highly transmissive for said infrared frequency modes, and said second mirror is highly reflective for said infrared and visible frequency modes.

13. An apparatus according to claim 9 further including a display screen and means for projecting said complementary visible image from said second mirror onto said display screen.

14. An apparatus according to claim 9 wherein said laser medium is a mixture of helium and neon gas.